US010058168B2

(12) United States Patent
Hendler et al.

(10) Patent No.: US 10,058,168 B2
(45) Date of Patent: Aug. 28, 2018

(54) PERSONAL CARE APPLIANCE

(71) Applicant: MICHAEL TODD LP, Port St. Lucie, FL (US)

(72) Inventors: Lewis Hendler, Rydal, PA (US); Haizhen Chen, Zhejiang (CN); Keyue Yu, Zhejiang (CN); Xushan Zhan, Zhejiang (CN)

(73) Assignee: MICHAEL TODD BEAUTY LP, Port St. Lucie, FL (US)

( * ) Notice: Subject to any disclaimer, the term of this patent is extended or adjusted under 35 U.S.C. 154(b) by 220 days.

(21) Appl. No.: 14/639,575

(22) Filed: Mar. 5, 2015

(65) Prior Publication Data

US 2015/0257521 A1 Sep. 17, 2015

Related U.S. Application Data

(60) Provisional application No. 61/951,070, filed on Mar. 11, 2014.

(51) Int. Cl.
*A46B 13/02* (2006.01)
*A46B 13/00* (2006.01)
*H02K 33/16* (2006.01)

(52) U.S. Cl.
CPC ............ *A46B 13/008* (2013.01); *A46B 13/02* (2013.01); *A46B 13/023* (2013.01); *H02K 33/16* (2013.01); *A46B 2200/102* (2013.01)

(58) Field of Classification Search
CPC ...... H02K 33/16; A46B 13/008; A46B 13/02; A46B 13/023
See application file for complete search history.

(56) References Cited

U.S. PATENT DOCUMENTS

| | | | |
|---|---|---|---|
| 3,030,967 | A | 4/1962 | Peyron |
| 3,500,080 | A | 3/1970 | Bey |
| 3,699,952 | A | 10/1972 | Waters et al. |
| 3,906,940 | A | 9/1975 | Kawada |
| 3,968,789 | A | 7/1976 | Simoncini |
| 4,027,348 | A | 6/1977 | Flowers et al. |

(Continued)

FOREIGN PATENT DOCUMENTS

| | | |
|---|---|---|
| WO | 97/22325 | 6/1997 |
| WO | 03/096860 | 11/2003 |

*Primary Examiner* — Shay Karls

(74) *Attorney, Agent, or Firm* — Eckert Seamans Cherin & Mellott, LLC; Philip E. Levy

(57) ABSTRACT

Portable, electrically driven, handheld sonic personal skin/hair care device includes a housing and a drive assembly to which is coupled a treatment member. The treatment member may include active ingredients incorporated during manufacturing that safely resist and inhibit the growth of mold, mildew and bacteria. The drive assembly includes a stator assembly, armature assembly, mounting member attached to the housing, elongated pivot arm having a first end directly coupled to the armature assembly and a second end directly coupled to the mounting member, and mounting arm having first and second ends, the first end being directly coupled to the armature assembly and the second end being directly coupled to the treatment member such that the stator, when energized, causes oscillation of the armature in an arcuate manner about a pivot point located at the mounting member in turn causing the treatment member to oscillate relative to the housing.

23 Claims, 7 Drawing Sheets

(56) References Cited

U.S. PATENT DOCUMENTS

| | | | |
|---|---|---|---|
| 4,040,414 | A | 8/1977 | Suroff |
| 4,158,246 | A | 6/1979 | Meadows et al. |
| 4,203,431 | A | 5/1980 | Abura et al. |
| 4,281,987 | A | 8/1981 | Kleesattel |
| 4,670,931 | A | 6/1987 | Abbassi |
| 4,724,563 | A | 2/1988 | Fry et al. |
| 4,919,117 | A | 4/1990 | Muchisky et al. |
| 5,012,797 | A | 5/1991 | Liang et al. |
| 5,186,627 | A | 2/1993 | Amit et al. |
| 5,189,751 | A | 3/1993 | Giuliani et al. |
| 5,467,495 | A | 11/1995 | Boland et al. |
| 5,544,282 | A | 8/1996 | Chen et al. |
| 5,624,416 | A | 4/1997 | Schatz |
| 5,687,442 | A | 11/1997 | McLain |
| 5,697,115 | A | 12/1997 | Sciarra et al. |
| 5,891,063 | A | 4/1999 | Vigil |
| 6,021,538 | A | 2/2000 | Kressner et al. |
| 6,032,313 | A | 3/2000 | Tsang |
| 6,108,847 | A | 8/2000 | Cueman et al. |
| 6,170,108 | B1 | 1/2001 | Knight |
| 6,253,405 | B1 | 7/2001 | Gutelius et al. |
| 6,363,565 | B1 | 4/2002 | Paffrath |
| 6,471,712 | B2 | 10/2002 | Burres |
| 6,564,940 | B2 | 5/2003 | Blaustein et al. |
| 6,569,170 | B1 | 5/2003 | Kellogg |
| 6,575,924 | B2 | 6/2003 | Wevers et al. |
| 6,645,184 | B1 | 11/2003 | Zelickson et al. |
| D500,209 | S | 12/2004 | Kellogg |
| 6,836,917 | B2 | 1/2005 | Blaustein et al. |
| 6,845,537 | B2 | 1/2005 | Wong |
| 7,157,816 | B2 | 1/2007 | Pilcher et al. |
| D549,964 | S | 9/2007 | Roth et al. |
| 7,320,691 | B2 | 1/2008 | Pilcher et al. |
| 7,386,906 | B2 | 6/2008 | Roth et al. |
| 7,469,703 | B2 | 12/2008 | France et al. |
| 7,786,626 | B2 | 8/2010 | Reishus et al. |
| D683,139 | S | 5/2013 | Chikos et al. |
| 8,469,909 | B2 | 6/2013 | Pilcher et al. |
| 8,484,788 | B2 | 7/2013 | Brewer et al. |
| 8,740,917 | B2 | 6/2014 | Pilcher et al. |
| 8,845,961 | B2 * | 9/2014 | Bernstein ................ A61L 2/081 250/492.1 |
| 9,167,886 | B2 * | 10/2015 | Gatzemeyer ......... A46B 11/001 |
| 9,307,827 | B2 * | 4/2016 | Brewer ................ A46B 15/001 |
| 2002/0040199 | A1 | 4/2002 | Klopotek |
| 2002/0049399 | A1 | 4/2002 | Stampf |
| 2003/0125754 | A1 | 7/2003 | Davis et al. |
| 2005/0280319 | A1 * | 12/2005 | Pilcher ................... H02K 33/16 310/36 |
| 2007/0186453 | A1 * | 8/2007 | Little ..................... A45D 24/02 40/314 |
| 2007/0198031 | A1 | 8/2007 | Kellogg |
| 2008/0106156 | A1 * | 5/2008 | Reishus ................. H02K 33/16 310/36 |
| 2008/0141479 | A1 * | 6/2008 | Mink ..................... A46B 9/021 15/207.2 |
| 2009/0177125 | A1 | 7/2009 | Pilcher et al. |
| 2009/0198262 | A1 | 8/2009 | Rosenblood et al. |
| 2009/0306577 | A1 | 12/2009 | Akridge et al. |
| 2012/0159795 | A1 | 6/2012 | Walmsley |

* cited by examiner

PERSONAL CARE APPLIANCE

CROSS-REFERENCE TO RELATED APPLICATIONS

This application claims priority under 35 U.S.C. § 1.19(e) from U.S. Provisional Application No. 61/951,070 entitled "Personal Care Appliance" and filed on Mar. 11, 2014, the disclosure of which is incorporated herein by reference.

BACKGROUND OF THE INVENTION

1. Field of the Invention

The present invention pertains to personal care appliances, such as a power skin care brush, that are used to care for, clean and otherwise treat skin and hair, and, in particular, to a portable, electrically driven, handheld device that may he used to care for, clean and otherwise treat skin and hair.

2. Description of the Related Art

Handheld personal care appliances used to care for, clean or otherwise treat the skin or hair (e.g., to clean, massage and/or apply creams, cleansing solutions or other substances to the skin or hair) are known and have gained increasing popularity. Such devices are most often used to provide daily hygienic skin care, in particular care for the facial skin. These devices usually include a small handheld casing having an internal motor and a self-contained power source (such as a battery) for producing a particular movement/action of a workpiece (e.g., a brush or pad), which in turn produces desired functional results. Examples of such appliances include power skin brushes and power toothbrushes, among others. Such personal care appliances have motor arrangements which produce either rotational movement or oscillating (back and forth) movement.

While many such devices are known, there is room for improvement in the field of personal care appliances such as handheld skin and hair treatment devices. Hence, it is desirable to have a personal care appliance having a drive assembly which is powerful (stronger and faster), energy efficient, quiet and durable. It would also be further desirable to according to an aspect of the present invention described herein, incorporate into the workpiece during the manufacturing stage active ingredients that are safe for use on the skin and resist and inhibit the growth of mold, mildew, fungus and/or bacteria on the workpiece keeping the workpiece cleaner and healthier for a longer period of time. By helping prevent the growth of microorganisms, stain and odor control is also achieved.

SUMMARY OF THE INVENTION

Accordingly, it is an object of the present invention to provide a personal care appliance that (i) employs a new and improved mechanism for producing oscillating action of a workpiece, such as a brush or pad, which is powerful (stronger and faster), energy efficient, quiet and durable, and (ii) utilizes a workpiece incorporating active ingredients in the manufacturing stage that are safe for use on the skin and resist and inhibit the growth of mold, mildew, fungus and/or bacteria on the workpiece to maintain the workpiece cleaner and healthier for a longer period of time. By helping prevent the growth of microorganisms, stain and odor control is also achieved.

In one embodiment, a personal care appliance is provided that includes a housing, a drive assembly provided in the housing, and a workpiece member coupled to and driven by the drive assembly. On one specific exemplary implementation, the workpiece member includes active ingredients incorporated during the manufacturing stage that safely resist and inhibit the growth of mold, mildew, fungus and/or bacteria. The drive assembly includes a stator assembly, an armature assembly adjacent the stator assembly and responsive to the stator action to move through a path, a mounting member attached to the housing of the personal care appliance, an elongated pivot arm having a first end directly coupled to the armature assembly and a second end directly coupled to the mounting member such that the armature in operation oscillates in an arcuate manner about a pivot point located at the mounting member, and a mounting arm having a first end and a second end, the first end being directly coupled to the armature assembly. The stator, when energized, is structured to cause the armature to oscillate (which oscillation, as described above, is in an arcuate manner about a pivot point located at the mounting member). The workpiece member is coupled to the second end of the mounting arm such that oscillation of the armature assembly causes the workpiece member to oscillate relative to the housing.

In another embodiment, a personal care appliance is provided that includes a housing, a drive assembly provided in the housing, the drive assembly including a stator assembly and an armature assembly adjacent the stator assembly, wherein the stator, when energized, is structured to cause the armature to oscillate, and a workpiece member coupled to the armature assembly such that oscillation of the armature assembly causes the workpiece member to oscillate relative to the housing, wherein the workpiece member incldues one or more components made with an antimicrobial material that is both (i) safe for use on the skin, and (ii) resists and/or inhibits the growth of mold, mildew, fungus and/or bacteria.

DETAILED DESCRIPTION OF EXEMPLARY EMBODIMENTS

Figure 1A:
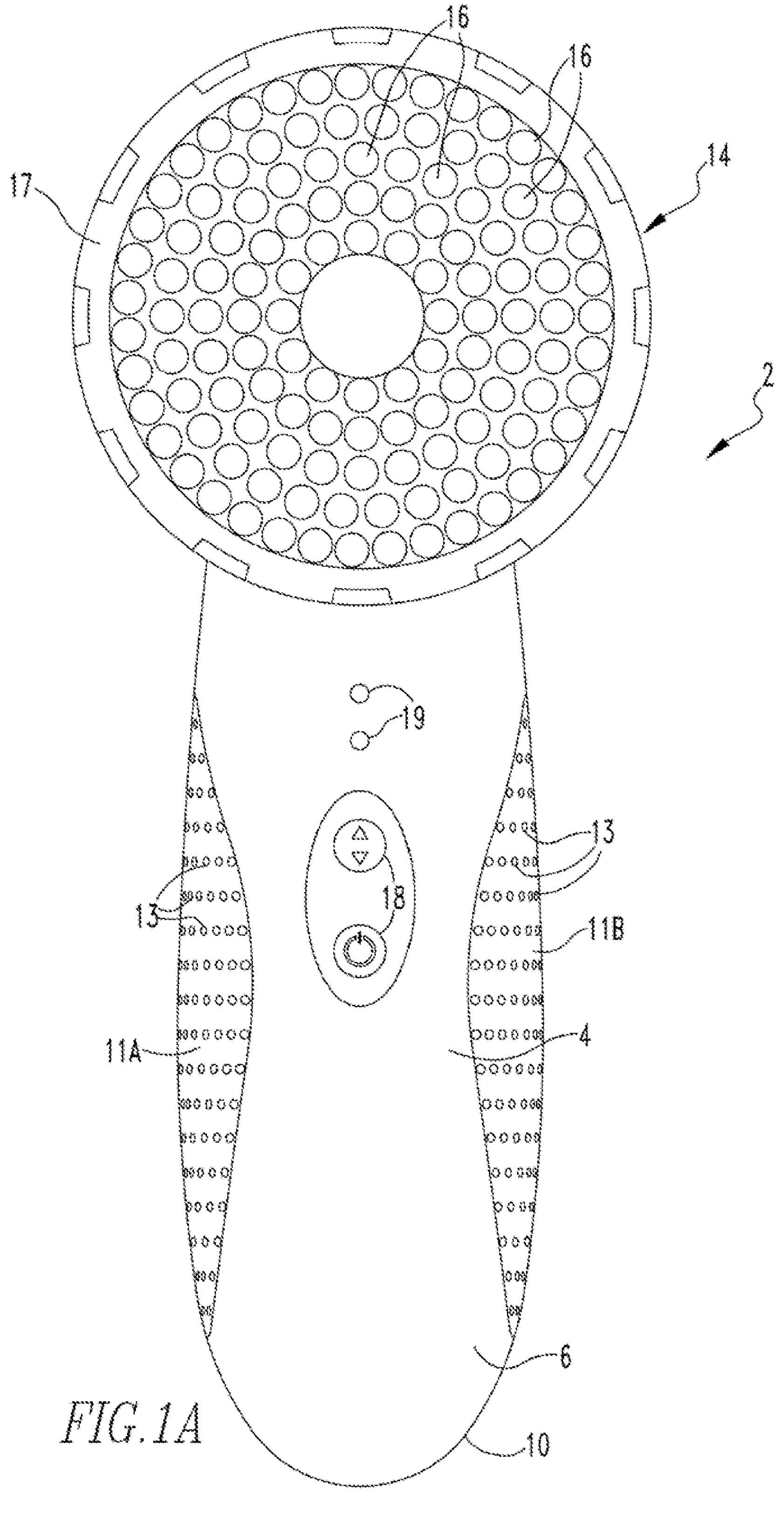
FIG. 1A is a front elevational view.

As used herein, the singular form of "a", "an", and "the" include plural references unless the context clearly dictates otherwise.

As used herein, the statement that two or more parts or elements are "coupled" shall mean that the parts are joined or operate together either directly or indirectly, i.e., through one or more intermediate parts or elements, so long as a link occurs.

As used herein, "directly coupled" means that two elements are directly in contact with each other.

As used herein, "fixedly coupled" or "fixed" means that two elements are coupled so as to move as one while maintaining a constant orientation relative to each other.

As used herein, the word "unitary" means a part is created as a single piece or unit. That is, a part that includes pieces that are created separately and then coupled together as a unit is not a "unitary" part or body.

As employed herein, the statement that two or more parts or elements "engage" one another shall mean that the parts exert a force against one another either directly or through one or more intermediate parts or elements.

As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Figure 1B:
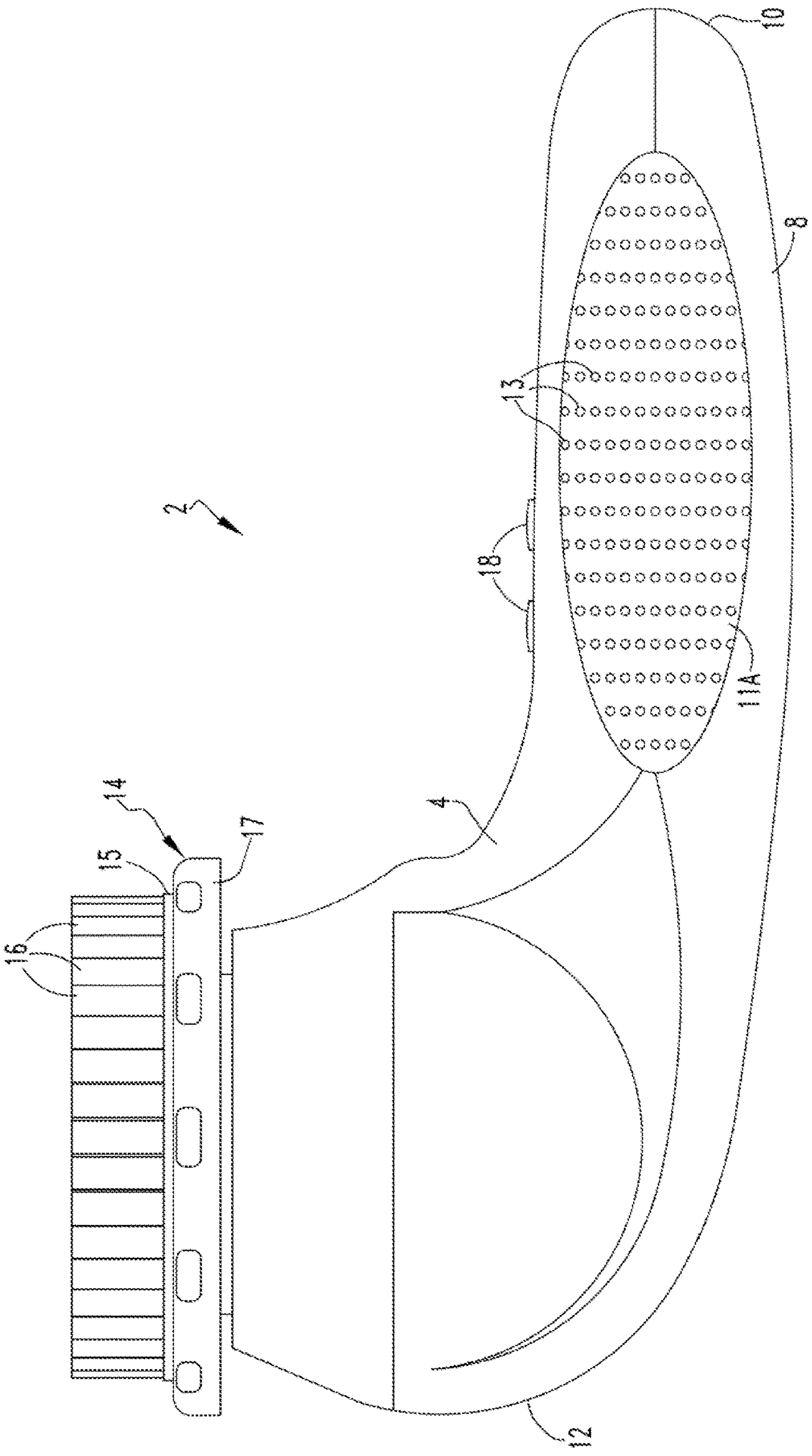
FIG. 1B is a side elevational view.
Figure 1C:
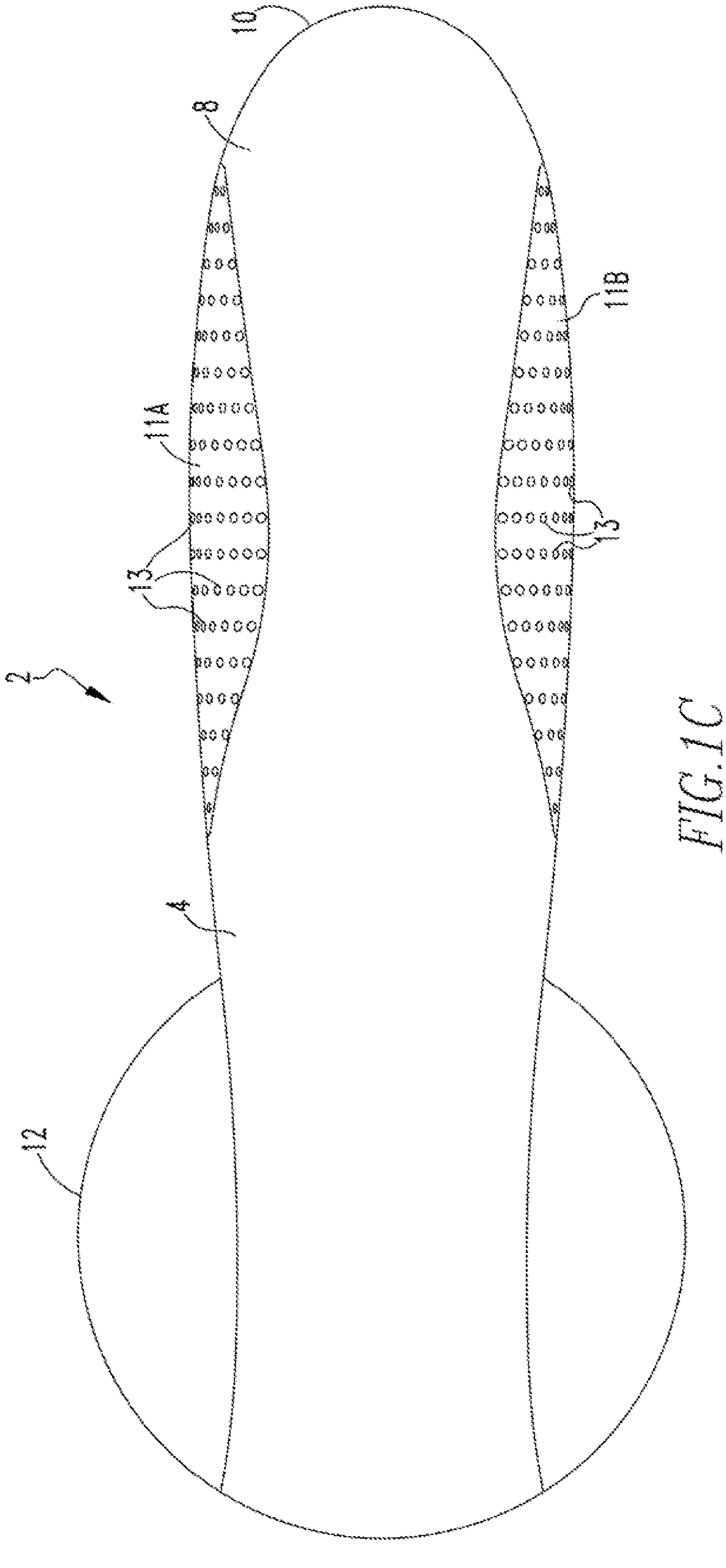
FIG. 1C is a rear elevational view of a handheld skin care and treatment device according to an exemplary embodiment of the present invention.

FIG. 1A is a front elevational view, FIG. 1B is a side elevational view, and FIG. 1C is a rear elevational view of a handheld personal care appliance 2 according to an exemplary embodiment of the present invention. In the illustrated embodiment, personal care appliance 2 includes a two-pan main housing 4 having a first (front) portion 6 and a second (rear) portion 8 coupled to the first portion 6. Also, main housing 4 includes a handle portion 10 provided at a first end thereof and structured to enable the user to grip and hold personal care appliance 2, and an attachment portion 12 provided at a second end thereof and structured to mount and hold a workpiece member in a manner that permits the workpiece member to he oscillated for use in skin and/or hair care, cleaning and treatment as described in detail herein. In addition, in the exemplary embodiment, handle portion 10 is provided with non-slip overlay portions 11A and 11B that are coupled to the surface of handle portion 10. Non-slip overlay portions 11A and 11B are made of a material, such as rubber, and include a plurality of protruding members (e.g., bumps) 13 to aid in securely gripping and holding personal care appliance 2.

In the illustrated, non-limiting embodiment, workpiece member is a circular brush head assembly 14 having a base member 15, a plurality of bristles 16 arranged on and extending from base member 15 in a circular pattern, and a locking ring 17 structured to secure brush head assembly 14 in place. It will be appreciated, however, that other types of workpiece members may be used in place of bush head assembly 14, such as, without limitation, a pad member assembly or massage head assembly.

Because of the presence of microbes such as bacteria and fungi in all walks of human life, there is a constant interaction between microbes and humans. This is especially so in the workpiece member, where skin cells left on the bristles 16 from the exfoliating effects of the brush head or other workpiece member provide a food source for microorganisms, which when combined with moisture and light, provide a breeding ground for the growth of mold, mildew and fungus, as well as, microbes, pathogens and bacteria, such as *E. coli* and *Staph*, and other microorganisms. Tests have shown that on unprotected surfaces, bacteria can double in number every 20 minutes.

Thus, in one non-limiting exemplary embodiment, the components of the workpiece member including, without limitation, the bristles 16 are made with active ingredients during the manufacturing stage that are both (i) safe for use on the skin, and (ii) resist and inhibit the growth of mold, mildew, fungus and/or bacteria on the workpiece member, keeping the workpiece member cleaner and healthier for a longer period of time. By helping prevent the growth of microorganisms, stain and odor control is also achieved.

Such active ingredients may include, for example and without limitation, silver ion technology (wherein silver ions are incorporated as an additive at the time of manufacture, or applied as a coating after manufacture), which forms a safe protective antimicrobial surface to resist and inhibit bacterial growth by up to 99.94%. Such active ingredients may further include, without limitation, essential plant oils (e.g., cinnamon oil, clove oil, eucalyptus oil, oregano oil, lavender oil, leleshwa oil, lemon oil, lemon myrtle oil, mint oil, neem oil, nigella sativa (black cumin) oil, peppermint oil, sandalwood oil, ironwort oil, tea tree oil, and thyme oil), and essential minerals, or bacteria resistant polymers (e.g., a polymer that reduces the ability of pathogenic bacteria to attach to the polymer).

An actuator mechanism 18 including a number of buttons is provided on handle portion 10 for controlling the operation of personal care appliance 2 (i.e., controlling the starting, stopping and/or speed of the movement of brush head assembly 14). In addition, handle portion 10 also includes a number of indicator lights 19 for indicating various modes of operation of personal care appliance 2.

Figure 2:
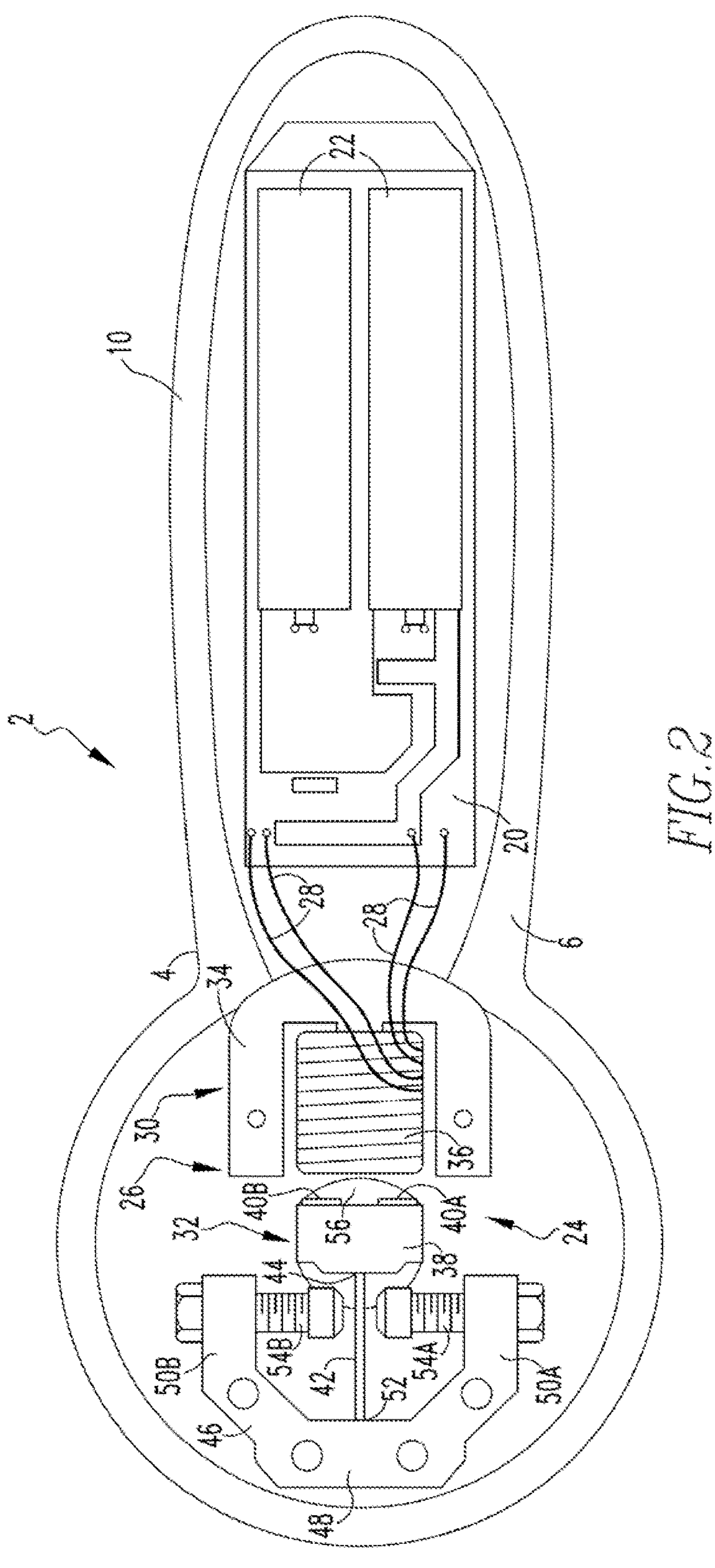
FIG. 2 is a rear elevational view of the device of FIGS. 1A-1C in a condition wherein the second portion of the main housing has been removed.
Figure 3:
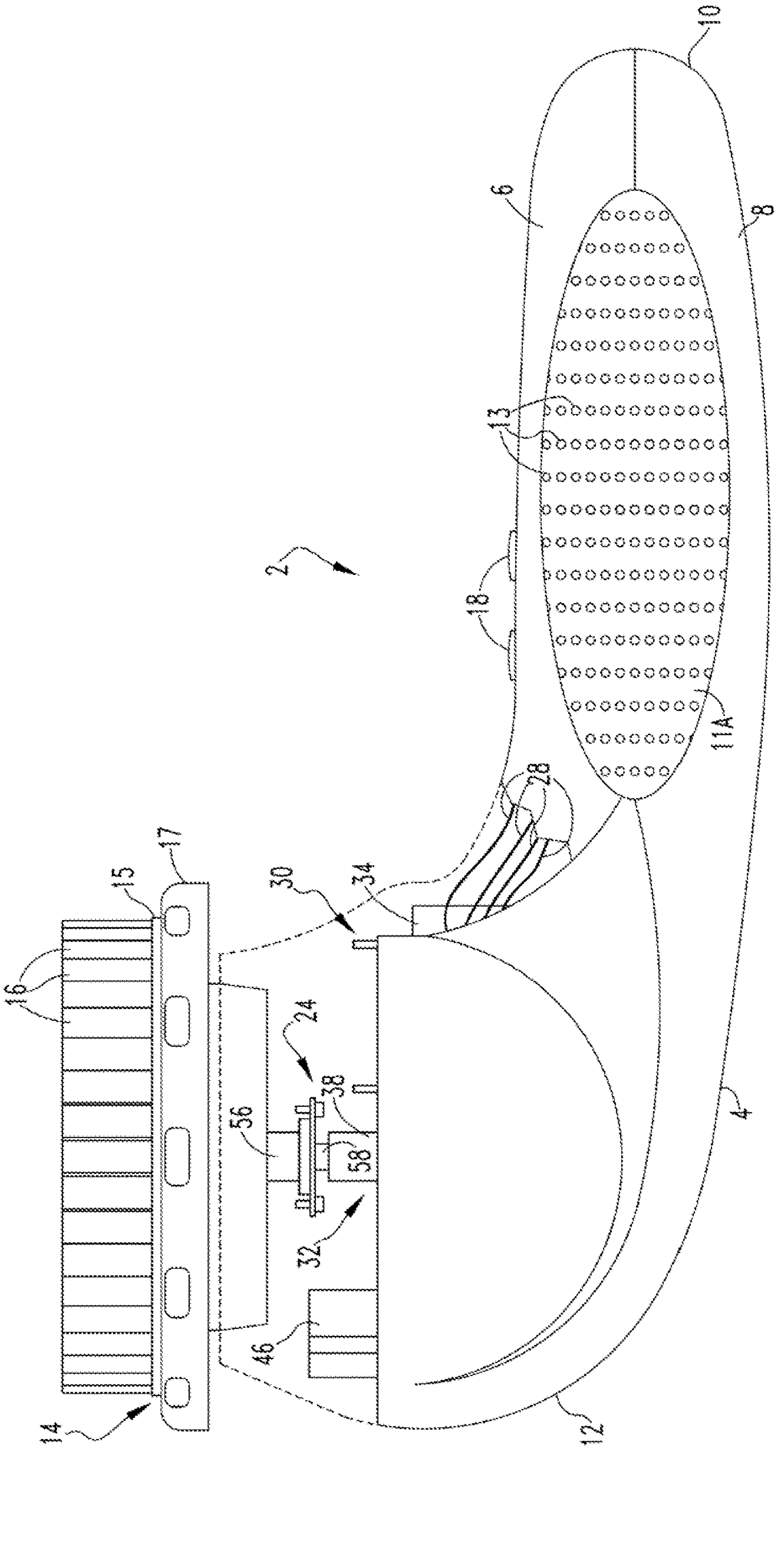
FIG. 3 is a side elevational view of device of FIGS. 1A-1C in a condition wherein a front part of the first portion of the main housing has been removed.

FIG. 2 is a rear elevational view of personal care appliance 2 in a condition wherein the second portion 8 of main housing 4 has been removed. FIG. 3 is a side elevational view of personal care appliance 2 in a condition wherein a front part of the first portion 6 of main housing 4 (i.e., the part located at attachment portion 12) has been removed. FIGS. 2 and 3 allow the internal components of personal care appliance 2 to be readily viewed. As seen in FIG. 2, a main circuit board 20 is mounted and held within handle portion 10 of main housing 4. Main circuit board 20 includes the control electronics which control the operation of personal care appliance 2. A rechargeable battery 22 is coupled to main circuit board 20 and is adapted to provide power for personal care appliance 2.

Figure 4:
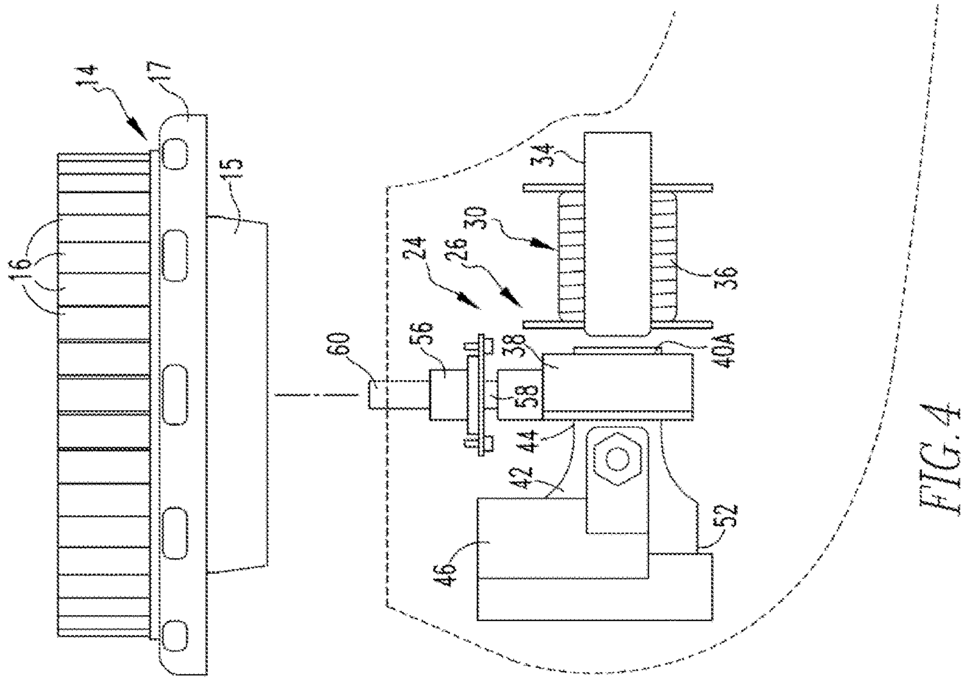
FIG. 4 is an exploded side elevational view of the drive assembly and brush head assembly of the device of FIGS. 1A-1C.

In addition, as seen in FIGS. 2 and 3, a drive assembly 24 is mounted and held within attachment portion 12 of main housing 4. Brush head assembly 14 is structured to be selectively attached to drive assembly 24 so that, as described in more detail below, drive assembly 24 is able to move brush head assembly 14 in an oscillating manner with respect to main housing 4. FIG. 4 is an exploded side elevational view of drive assembly 24 and brush head assembly 14 (without the associated portions of main housing 4).

As seen in FIGS. 2-4, drive assembly 24 includes an electric motor 26 that is coupled to main circuit board 20 and rechargeable battery 22 by wires 28. Motor 26 includes a stator assembly 30 and an armature assembly 32. Stator assembly 30 includes an E-core member 34 having first and second outer legs and a center leg in between the outer legs, and a stator coil 36 wrapped around the center leg of E-core member 34. Armature assembly 32 includes a main body portion 38 and first and second magnets 40A, 40B spaced apart from one another and coupled to a first side of main body portion 38. First and second magnets 40A, 40B are oriented such that the poles of first and second magnets 40A, 40B face in opposite directions (e.g., the N pole of magnet 40A faces stator assembly 30 and the S pole of magnet 40 B faces stator assembly 30).

Drive assembly 24 further includes a pivot arm 42 having a first end 44 directly coupled to a second side of main body portion 38 (opposite the first side thereof). In the exemplary embodiment, pivot arm 42 is a thin, elongated piece of metal such as, without limitation steel. Drive assembly 24 also includes a mounting member 46 which is coupled to first portion 6 of main housing 4. In the exemplary embodiment, mounting member 46 is made of a plastic material, such as, without limitation, a thermoplastic, by a molding process. As seen in FIG. 2, mounting member includes a base portion 48 and first and second arms 50A and 50B extending outwardly and downwardly from base member 48 such that the end of arms 50A and SOB are perpendicular to the longitudinal axis of base member 48. A second end 52 of pivot arm 42 is directly coupled to base member 48. Thus, as seen in FIG. 2, the longitudinal axis of pivot arm 42 is perpendicular to the longitudinal axis of base member 48. In the exemplary embodiment, an end portion of second end 52 of pivot arm 42 is molded inside base portion 48 such that end portion of second end 52 of pivot arm 42 is fixed inside and not moveable relative to base portion 48. As described herein, only the portion of pivot arm 42 that is located outside of base portion 48 is moveable relative to base portion 48.

First and second constraining members 54A and 54B are attached to respective ones of the arms 50A and 50B and extend in a direction that is perpendicular to the longitudinal axis of pivot arm 42. In the exemplary embodiment, constraining members 54A and 54B comprise springs to constrain and assist (i.e., drive) the movement of pivot arm 42 when necessary, which is believed to assist with the generation of speed and/or power of the oscillations.

Drive assembly 24 further includes a mounting arm assembly 56 for coupling brush head assembly 14 to drive assembly 24. In particular, mounting arm assembly 56 includes a first end 58 that is directly coupled to main body portion 38 of armature assembly 32, and a peg member 60 that is structured to be selectively coupled to brush head assembly 14 through a central aperture provided in attachment portion 12 (peg member 60 is structured to extend through that central aperture to facilitate selective connection of brush head assembly 14, or a different skin treatment attachment device, thereto). Thus, as shown in FIG. 4, when assembled, the center of base member 15 of brush head assembly 14 will be positioned directly over armature assembly 32.

In operation, when power is provided to motor 26 by rechargeable battery 22, armature assembly 32 will be caused to oscillate back and forth in an arcuate path about a pivot point located at mounting member 48 as a result of the changing magnetic field produced in stator assembly 30 and the interaction of magnets 40A, 40B therewith. As a result, brush head assembly 14 will be caused to oscillate with respect to main housing 4. A user may then apply the oscillating bush head assembly 14 to different areas of skin and/or hair (e.g., the lace, feet, etc.) to provide care and treatment for the skin and/or hair, for example by using, the oscillating brush head assembly to apply a cleansing solution of another substance to the user's skin and/or hair.

In one particular exemplary embodiment, personal care appliance 2 is structured and configured such that brush head assembly 14 will be caused to oscillate with respect to main housing 4 at a rate up to 330 times/second. In addition, in this particular embodiment, rechargeable battery 22 is structured and configured such that personal care appliance 2 will operate for about 30-40 minutes on a single charge and such that only about 2 milliamperes is consumed when personal care appliance 2 is not in use (which prolongs the battery life).

Figure 5:
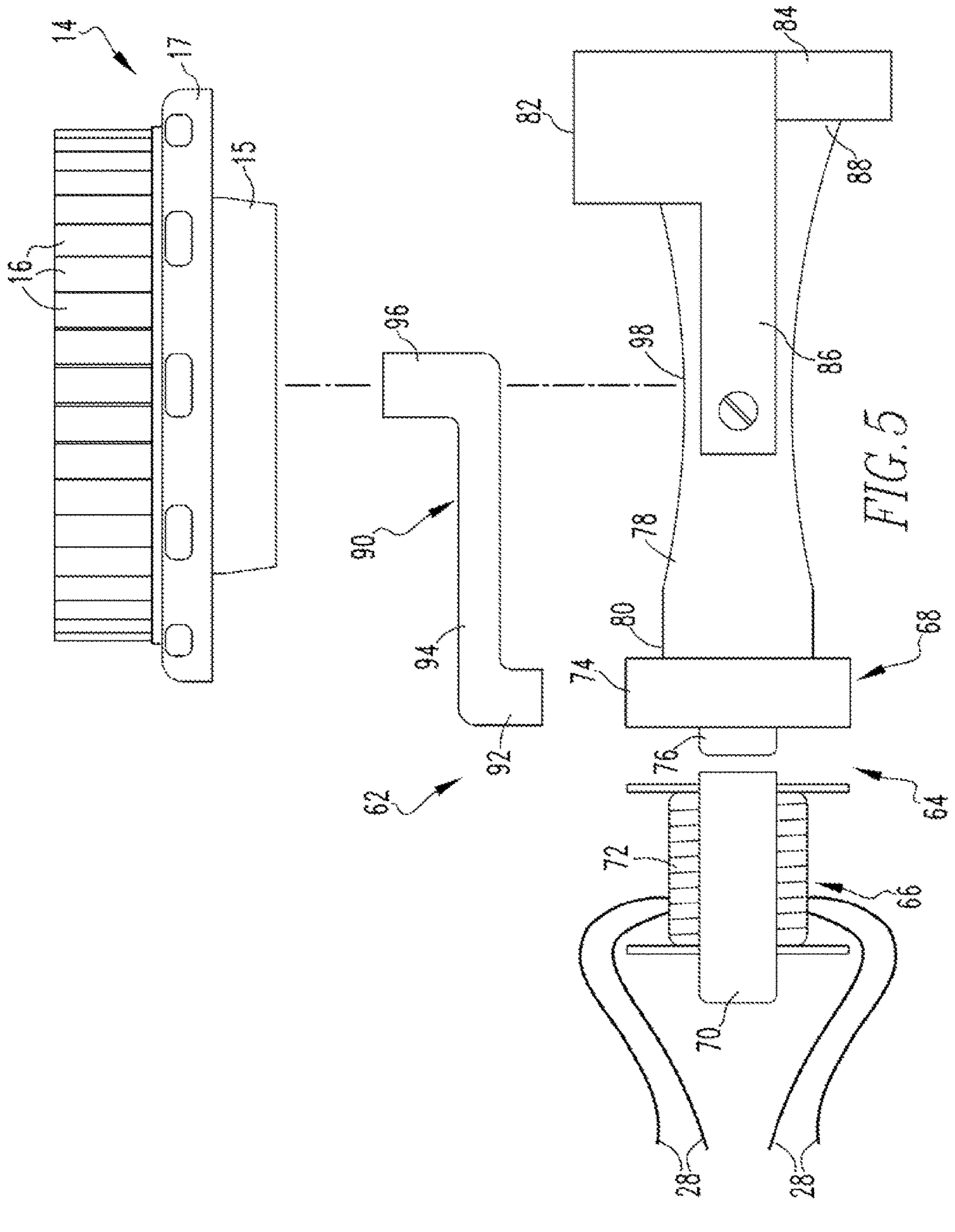
FIG. 5 is an exploded side elevational view of an alternative drive assembly and brush head assembly that may be used with the device of FIGS. 1A-1C.

FIG. 5 is an exploded side elevational view of a drive assembly 62 according to an alternative exemplary embodiment of the present invention. Drive assembly 62 may be used in place of drive assembly 24 to drive brush head assembly 14. As seen in FIG. 5, drive assembly 62 includes an electric motor 64 that may be coupled to main circuit board 20 described herein by wires 28. Motor 64 is similar to motor 26 and includes a stator assembly 66 and an armature assembly 68. Stator assembly 66 includes an E-core member 70 having first and second outer legs and a center leg in between the outer legs, and a stator coil 72 wrapped around the center leg of E-core member 70. Armature assembly 68 includes a main body portion 74 and first and second magnets 76 spaced apart from one another and coupled to a first side of main body portion 74. First and second magnets 76 are oriented such that the poles thereof face in opposite directions.

Drive assembly 62 further includes a pivot arm 78 having a first end 80 directly coupled to a second side of main body portion 74 (opposite the first side thereof). In the exemplary embodiment, pivot aim 78 is a thin, elongated piece of metal such as, without limitation steel. Drive assembly 62 also includes a mounting member 82 which may be coupled to first portion 6 of main housing 4. Mounting member 82 includes a base portion 84 and first and second arms 86 extending outwardly and downwardly from base member 84 such that the end alarms 86 are perpendicular to the longitudinal axis of base member 84. A second end 88 of pivot arm 78 is directly coupled to base member 82. Thus, the longitudinal axis of pivot arm 78 is perpendicular to the longitudinal axis of base member 84. Also, first and second constraining members (like constraining members 54A and 54B) are attached to respective ones of the arms 86 and extend in a direction that is perpendicular to the longitudinal axis of pivot arm 78. In the exemplary embodiment, an end portion of second end 88 of pivot arm 78 is molded inside base portion 84 such that end portion of second end 88 of pivot arm 78 is fixed inside and not moveable relative to base portion 84. As described herein, only the portion of pivot arm 78 that is located outside of base portion 84 is moveable relative to base portion 84.

Drive assembly 62 also further includes an S-shaped mounting arm 90 for coupling brush head assembly 14 to drive assembly 62. In particular, S-shaped mounting arm 90 includes a first portion 92, an elongated second portion 94 coupled to first portion 92, and a third portion 96 coupled to second portion 94. As seen in FIG. 5, in the exemplary embodiment, first portion 92 and third portion 96 extend in directions that are parallel to one another, and second portion 94 extends in a direction that is perpendicular to first and third portions 92, 96. Also in the exemplary embodiment, mounting arm 90 is a thin, elongated piece of metal such as, without intimation steel. First end 92 of mounting area 90 is directly coupled to main body portion 74 of armature assembly 68, and third portion 96 is structured to be selectively coupled to brush head assembly 14 through a central aperture provided in attachment portion 12 (third portion 96 is structured to extend through that central aperture to facilitate selective connection of brush head assembly 14, or a different skin treatment attachment device, thereto). Thus, as shown in FIG. 5, when assembled, the center of base member 15 of brush head assembly 14 will be positioned over a midpoint 98 of pivot arm 78.

In operation, when power is provided to motor 64, armature assembly 68 will be caused to oscillate back and forth in an arcuate path about a pivot point provided at mounting member 82 as a result of the changing magnetic field produced in stator assembly 66 and the interaction of magnets 70 therewith. As a result, brush head assembly 14 will be caused to oscillate with respect to main housing 4. A user may then apply the oscillating bush head assembly 14 to different areas of skin (e.g., the face, feet, etc.) to provide care and treatment for the skin, for example by using the oscillating brush head assembly to apply a cleansing solution to the user's skin.

In the claims, any reference signs placed between parentheses shall not he construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A personal care appliance for cleaning, massaging and/or applying a substance to skin or hair, comprising:

a housing;

a drive assembly provided in the housing, the drive assembly including a stator assembly, an armature assembly adjacent the stator assembly, a mounting member attached to the housing, an elongated pivot arm having a first end directly coupled to the armature assembly and a second end directly coupled to the mounting member, and a mounting arm having a first end and a second end, the first end being directly coupled to the armature assembly, wherein the stator, when energized, is structured to cause the armature to oscillate in an arcuate manner about a pivot point located at the mounting member; and a workpiece member coupled to the second end of the mounting arm such that oscillation of the armature assembly causes the workpiece member to oscillate relative to the housing.

2. The personal care appliance according to claim 1, wherein the mounting member has a base member having a first longitudinal axis, wherein the pivot arm has a second longitudinal axis perpendicular to the first longitudinal axis.

3. The personal care appliance according to claim 1, wherein the mounting arm is an S-shaped mounting arm such that a central portion of the workpiece member is positioned over a central portion of the pivot arm between the armature assembly and the mounting member.

4. The personal care appliance according to claim 3, wherein the pivot arm has a midpoint, and wherein a center of the workpiece member is positioned directly over the midpoint.

5. The personal care appliance according to claim 4, wherein the mounting arm has an elongated central portion provided between the first end and the second end, the elongated central portion having a third longitudinal axis that is parallel to the second longitudinal axis when the armature assembly is not oscillating.

6. The personal care appliance according to claim 5, wherein the mounting arm has a first portion including the first end of the mounting arm and a second portion including the second end of the mounting arm, wherein the first portion and the second portion are perpendicular to the third longitudinal axis.

7. The personal care appliance according to claim 1, further comprising a first constraining member provided adjacent a first side of the pivot arm and a second constraining member provided adjacent a second side of the pivot arm opposite the first side of the pivot arm.

8. The personal care appliance according to claim 7, wherein the first and second constraining members are each oriented in a direction that is perpendicular to the second longitudinal axis of the pivot arm.

9. The personal care appliance according to claim 7, wherein the first and second constraining members each include a spring.

10. The personal care appliance according to claim 1, wherein the workpiece member is selectively attachable to and detachable from the second end of the mounting arm.

11. The personal care appliance according to claim 1, wherein the workpiece member comprises a brush head assembly having a plurality of bristles extending therefrom.

12. The personal care appliance according to claim 11, wherein the brush head assembly comprises a circular, disk shaped base member.

13. The personal care appliance according to claim 12, wherein the overlay portions are made of a rubber material.

14. The personal care appliance according to claim 1, wherein the workpiece member comprises one or more components made with an antimicrobial material that is both (i) safe for use on the skin, and (ii) resists and/or inhibits the growth of mold, mildew, fungus and/or bacteria.

15. The personal care appliance according to claim 14, wherein the workpiece member comprises a brush head assembly having a plurality of bristles extending therefrom, wherein the bristles include the antimicrobial material as an additive thereto and/or are coated with the antimicrobial material.

16. The personal care appliance according to claim 14, wherein the antimicrobial material includes silver ions.

17. The personal care appliance according to claim 14, wherein the antimicrobial material includes essential plant oils and/or essential minerals.

18. The personal care appliance according to claim 14, wherein the antimicrobial material includes a bacteria resistant polymer.

19. The personal care appliance according to claim 18, wherein the overlay portions include a plurality of protruding members extending outwardly therefrom.

20. The personal care appliance according to claim 1, wherein the elongated pivot arm is made of metal.

21. The personal care appliance according to claim 1, wherein the armature assembly includes a main body and a pair of magnets attached to the main body, and wherein the first end of the mounting arm is directly coupled to the main body.

22. The personal care appliance according to claim 1, wherein a portion of the second end of the pivot arm is provided inside the mounting member such that portion of the second end of the pivot arm is fixed inside and not moveable relative to the mounting member.

23. The personal care appliance according to claim 1, wherein the housing includes a handle portion, and wherein the handle portion is provided with a number of overlay portions structured to prevent the personal care appliance from slipping during use.

* * * * *